W. H. SMITH.
LAWN SPRINKLER.
APPLICATION FILED JUNE 3, 1912. RENEWED JUNE 14, 1913.
1,067,886.
Patented July 22, 1913.
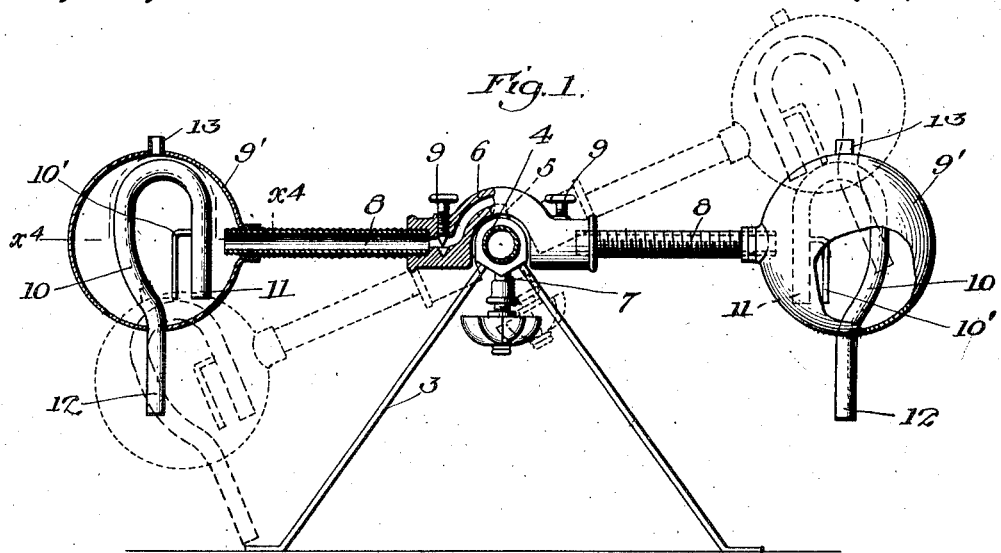
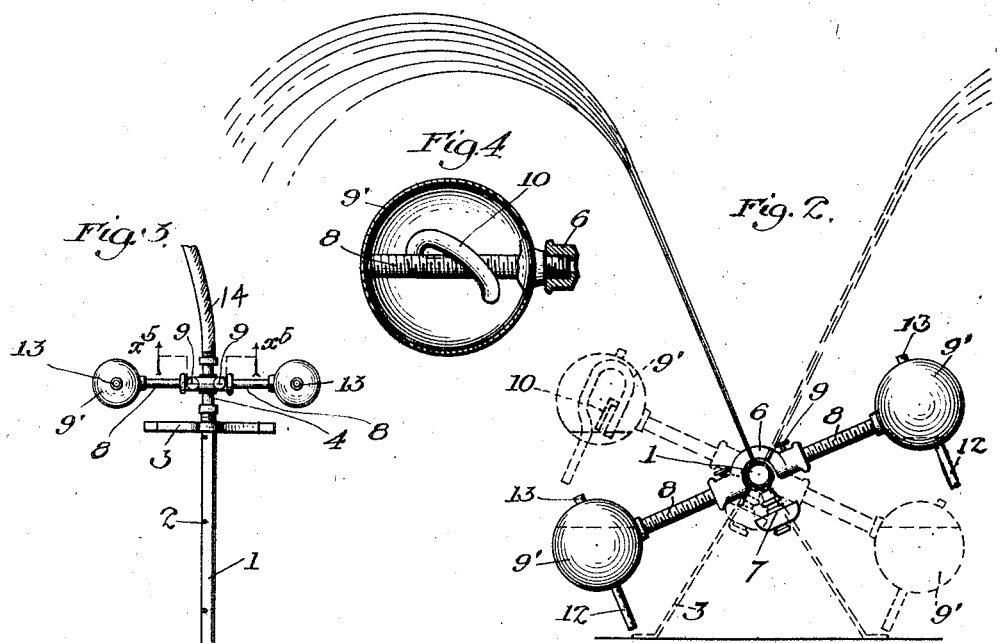
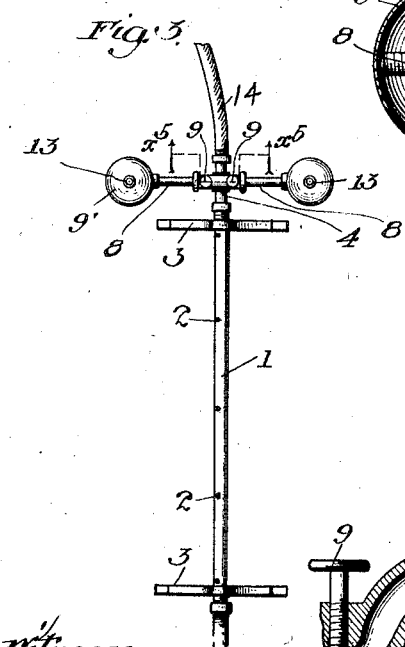
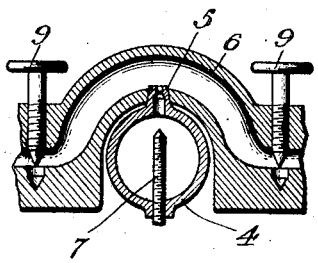
Inventor:
William H. Smith

UNITED STATES PATENT OFFICE.

WILLIAM H. SMITH, OF SOUTH PASADENA, CALIFORNIA.

LAWN-SPRINKLER.

1,067,886.  Specification of Letters Patent.  Patented July 22, 1913.

Application filed June 3, 1912, Serial No. 701,443. Renewed June 14, 1913. Serial No. 773,777.

*To all whom it may concern:*

Be it known that I, WILLIAM H. SMITH, a citizen of the United States, residing at South Pasadena, in the county of Los Angeles and State of California, have invented a new and useful Lawn-Sprinkler, of which the following is a specification.

This invention relates to sprinklers adapted for sprinkling lawns, gardens, or other places, and has for its object to deliver the water through a row of orifices in a pipe, and to automatically oscillate the said pipe whereby the water will be distributed over a greater area than if the pipe were stationary, and the water will be delivered to cover a rectangular area.

Referring to the drawings: Figure 1 is a front elevation partly in section. Fig. 2 is a front elevation showing the two extreme positions of the parts. Fig. 3 is a plan view. Fig. 4 is a section on line $x^4$—$x^4$, Fig. 1, showing the ball screwed closer toward the oscillating head. Fig. 5 is an enlarged section on line $x^5$—$x^5$, Fig. 3.

The sprinkler comprises a pipe 1 having perforations 2 which are arranged in line, forming a row. The pipe 1 is mounted to rock in standards 3. Secured to one end of the pipe 1 is a fitting 4 having a conical member 5 communicating with the interior of the fitting and resting on the fitting is an arched oscillating head 6 which, as clearly shown in Fig. 5, is formed with a perforation in its lower wall which fits over the conical nipple 5, so that the interior of the head 6 is in communication with the interior of the fitting 4. The head 6 may be lifted off from the nipple 5 whenever it is desired to remove the same, the joint made with the nipple 5 being sufficiently tight to prevent any appreciable leakage.

In order to admit and control the flow of water from the fitting 4 to the head 6 is a needle valve 7. Each end of the head 6 is formed as a threaded socket and receives a threaded pipe 8. Needle valves 9 are provided near each end of the head 6 to regulate the flow of water from the head to the pipes 8. Screwed on the outer ends of the pipes 8 are balls 9′ and within each ball 9′ is a pipe 10 bent and arranged to form a siphon. Each pipe 10 is so curved that it does not intersect the axis of the ball 9′ and thus permits the ball to be screwed close to the head 6, as shown in Fig. 4, this adjustment of the balls 9′ enabling proper balancing of the device. The inner end 11 of each pipe 10 is arranged close to the bottom wall of the ball as shown in Fig. 1, and where the pipe 10 passes through the ball 9′ it is secured thereto and a projection 12 extends from the pipe beyond the ball. In the upper wall of the ball is a vent 13.

In operation, water being admitted to the fitting 4 through a supply pipe 14 and valve 7 being opened, water flows into the head 6, and thence through the pipes 8 into the balls 9′. From the head 4, water also passes into the pipe 1 and thence issues through perforations 2. The oscillating movement is caused by tilting the balls 9′ in one direction or the other, either manually or by adjusting one of the balls at a different distance from the head 6 than the other, to produce a sufficiently unbalanced condition such that the balls will automatically assume an inclined position. One or two of the balls may be caused to fill with water, first by closing one of the needle valves 9, and opening the other, and when one ball has thus filled and the other ball is still empty, the other valve should be opened. This unbalanced condition, however, is only sufficient to produce the inclination referred to and is not enough to exert any appreciable influence on the oscillating movement as will be described. The balls having been tipped in either of the ways referred to, and water having entered the lowest ball to a point such that it fills the upper loop of the pipe 10 and overflows through the open lower end 12, a siphon action is thereby established which results in siphoning all of the water out of the lowermost ball, and as soon as sufficient water has been siphoned out of the lower ball to make the amount of water in the lower ball less than the amount which is in the higher ball, the higher ball then being heavier, commences to descend, and when the level of water in the latter ball has raised enough and commences to siphon, and enough water has escaped to make that ball lighter than the first ball, then the first ball which in the meantime has also been filling with water, again descends. Thus each ball alternately fills with water and after filling, automatically discharges its water by the automatic siphoning operation, thereby producing an unbalanced condition of the device which alternates such that an automatic oscillation is produced, thereby rocking the pipe 1 and causing water to be distributed over a large area.

Fig. 2 illustrates in full lines, water being delivered to the extreme left, and as the device swings in the opposite direction, the water gradually falls at points closer to the right, until when in the extreme right position of the device, the water is thrown to the extreme right, as indicated in dotted lines. The amount of water permitted to flow into the balls 9' is comparatively slight and is governed by regulating the position of needle valves 9.

I prefer to construct the perforations 2 as comparatively large orifices, few in number, in order to obtain a much greater body of water through each discharge opening, and hence obtain much higher velocity of the same and consequently the water will be thrown a correspondingly greater distance. The streams which thus issue, though large, issue in a general direction away from the earth, so that they spread out as they fall back toward the earth and naturally divide into numerous small streams so that the distribution of water is uniformly made. If the pipe 1 were provided with numerous small orifices to divide the water at the point of issuance from the pipe, although a fine spray would be produced, it would not be projected for much of a distance.

The present device by reason of the large orifices and also by reason of the oscillating movement of the pipe 1, projects the water over a very much greater area than is possible otherwise.

A small pipe 10' is connected to the pipe 9 within the ball and the lower end of the small pipe 10' is level with the inner lower end of the pipe 10 and when the water has nearly siphoned out and the ball has been elevated the mouth of the small pipe 10' will be lifted above the level of the water, as indicated at the left in Fig. 2 so that air will enter the small pipe 10' and break the siphoning action.

What I claim is:

1. An oscillating discharge pipe, water receptacles on opposite sides thereof and communicating therewith, a siphon in each water receptacle, whereby the water automatically fills and discharges from said receptacles and produces an alternating unbalanced condition to oscillate said discharge pipe.

2. An oscillating discharge pipe, pipes extending in opposite directions therefrom and communicating therewith, water receptacles in communication with the latter pipes, siphons in said water receptacles, and a valve in each of the latter pipes between the discharge pipe and water receptacle.

3. An oscillating discharge pipe, an arched head detachably secured thereto, pipes extending from said arched head, water receptacles secured to said pipes and siphons in said water receptacles.

4. A discharge pipe with large orifices arranged in a line, a pivotal support for said discharge pipe, pipes projecting transversely of the discharge pipe, water receptacles on said transverse pipes, and siphons in said water receptacles.

5. An oscillating discharge pipe, a fitting secured thereto and having a conical nipple, an arched head perforated to fit said nipple, pipes projecting from opposite ends of said head, water receptacles adjustable on said pipes, and a siphon in each water receptacle.

6. An oscillating discharge pipe, a fitting secured thereto and having a conical nipple, an arched head perforated to fit said nipple, pipes projecting from opposite ends of said head, water receptacles adjustable on said pipes, a siphon in each water receptacle, and a valve in the discharge pipe for regulating the flow of water through said nipple.

7. An oscillating discharge pipe, a fitting secured thereto and having a conical nipple, an arched head perforated to fit said nipple, pipes projecting from opposite ends of said head, water receptacles adjustable on said pipes, a siphon in each water receptacle, and a valve near each end of the head for controlling the flow of water to the adjacent pipe.

8. An oscillating discharge pipe, a pipe extending transversely therefrom, a water receptacle on said transverse pipe, a siphon in the water receptacle comprising a pipe curved around the axis of said receptacle, the inner end of said pipe terminating at a point near the lower wall of said receptacle, the other end of said siphon pipe being projected through and beyond the receptacle, the said receptacle having a vent.

9. An oscillating discharge pipe, water receptacles on opposite sides thereof and communicating therewith, a siphon in each water receptacle whereby the water automatically fills and discharges from said receptacles thus producing an alternating unbalanced condition to oscillate said discharge pipe, and a small pipe within each receptacle, having its lower mouth level with the inner siphon mouth, the said small pipe communicating with the siphon at a point above the end of the siphon.

In testimony whereof, I have hereunto set my hand at Los Angeles, California this 27 day of May, 1912.

WILLIAM H. SMITH.

In presence of—
G. T. HACKLEY,
M. E. BLASDEL.